US008623953B2

(12) United States Patent
Butuc (10) Patent No.: US 8,623,953 B2
(45) Date of Patent: Jan. 7, 2014

(54) METHOD OF MAKING SHEAR THINNING GELS

(75) Inventor: Steluta Gina Butuc, The Woodlands, TX (US)

(73) Assignee: Calumet Penreco, LLC, Indianapolis, IN (US)

( * ) Notice: Subject to any disclaimer, the term of this patent is extended or adjusted under 35 U.S.C. 154(b) by 0 days.

(21) Appl. No.: 12/386,319

(22) Filed: Apr. 16, 2009

(65) Prior Publication Data

US 2009/0270546 A1 Oct. 29, 2009

(51) Int. Cl.
*C08K 5/01* (2006.01)
*H01B 3/44* (2006.01)
*C08L 53/00* (2006.01)
*C10L 1/16* (2006.01)

(52) U.S. Cl.
USPC ............ 524/476; 44/459; 424/59; 424/70.11; 516/98; 523/122; 524/210; 524/315; 524/474

(58) Field of Classification Search
USPC ............ 524/474, 505, 210, 315, 476; 44/275, 44/265, 459; 431/289; 424/78.03, 59, 424/70.11; 510/109, 185; 516/98; 523/122
See application file for complete search history.

(56) References Cited

U.S. PATENT DOCUMENTS

| 3,282,841 | A * | 11/1966 | Van Der Mey ................ 508/255 |
| 5,221,534 | A * | 6/1993 | DesLauriers et al. ...... 424/78.03 |
| 6,433,068 | B1 * | 8/2002 | Morrison et al. ............. 524/505 |
| 2002/0032982 | A1 * | 3/2002 | Berger et al. ................... 44/519 |
| 2002/0116867 | A1 * | 8/2002 | Allison et al. .................. 44/275 |
| 2004/0102562 | A1 * | 5/2004 | Butuc ........................... 524/474 |
| 2009/0022676 | A1 * | 1/2009 | Butuc ............................ 424/59 |

* cited by examiner

*Primary Examiner* — Bijan Ahvazi
(74) *Attorney, Agent, or Firm* — Barnes & Thornburg LLP (57) ABSTRACT

The present invention relates generally to gels that flow through an orifice. Specifically the invention relates to gels that are dispensed through a trigger spray nozzle or aerosol spray valve. Still more specifically, the invention relates to nonaquious gels containing polymers whose instantaneous viscosity reversibly decreases when the gel experiences shear loads. The invention includes spray gel compositions, methods of making spray gels and methods of dispensing gels whose viscosity exhibits an instantaneous temporary decrease in viscosity when the gel is subjected to shear force as happens when it flows through an orifice, such as a spray nozzle or aerosol valve.

18 Claims, 2 Drawing Sheets

Example 8

FIG 1

Gelled IPP #1004-41-4

FIG 2

Example 8

METHOD OF MAKING SHEAR THINNING GELS

CROSS REFERENCE TO RELATED APPLICATIONS

This application is a continuation of U.S. patent application Ser. No. 11/980,997, filed Oct. 31, 2007, now abandoned, which is a division of U.S. patent application Ser. No. 10/716,284, filed Nov. 18, 2003, now abandoned.

FEDERALLY SPONSORED RESEARCH OR DEVELOPMENT

Not applicable

BACKGROUND OF THE INVENTION

1. Field of the Invention

The present invention relates generally to gelled fluids that flow through an orifice in US class 22 subclass 272. Specifically the invention relates to gels that are dispensed through a trigger spray nozzle or aerosol spray valve. Still more specifically, the invention relates to nonaquious gels containing polymers whose instantaneous viscosity decreases when the gel is subjected to shear force. The invention includes spray gel compositions, methods of making spray gels and methods of dispensing gels whose viscosity exhibits an instantaneous temporary decrease in viscosity when the gel flows through an orifice, such as a spray nozzle or aerosol valve.

2. Background Information

Spray gels taught by the prior art are aqueous gels or hydrocarbon water emulsions, such as those used for hairspray and the like. An example is Amphomer LV-71® marketed by National Starch and Chemical, Bridgewater, N.J., which is used in personal care applications such as hair spray, spritzes, spray gels and setting lotions. These prior art aqueous gels must have low viscosity so they may be dispensed at low pressure through a manual trigger pump or at somewhat higher pressure by propellant from a spray can aerosol valve. The prior art also teaches the use of low viscosity hydrocarbon solvents in sprays. Hydrocarbon gels are too thick to use confidently in sprays, especially in low-pressure trigger sprays. These prior art pressure driven sprays are used to dispense a multitude of low viscosity household, cosmetic, personal care and industrial products. Some examples are furniture polish, insecticide, paint, lubricants, skin care products including sun care products or sun tan oils and many others that form an indispensable part of everyone's daily life.

In order to understand and appreciate the present invention, it is necessary to understand the prior art of aerosol spray cans and manual trigger sprays.

Aerosol Spray Cans

The concept of an aerosol sprays from pressurized containers originated as early as 1790, when self-pressurized carbonated beverages were introduced in France. In 1837, a man called Perpigna invented a soda siphon incorporating a valve. In 1899, inventors Helbling and Pertsch patented aerosols pressurized using methyl and ethyl chloride as propellants.

On Nov. 23, 1927, Erik Rotheim of Norway patented the first aerosol can and valve that could hold and dispense products and propellant systems. This was the forerunner of the modern aerosol can and valve.

During World War II, the U.S. government funded research into a portable way for service men to spray malaria-carrying bugs. Two Department of Agriculture researchers, Lyle Goodhue and William Sullivan, developed a small aerosol can to pressurized by a liquefied gas (a fluorocarbon) in 1943. Aerosol spray cans rely on a basic principle of physics: a gas under enough pressure will turn into a liquid, and as pressure is relieved, will expand and turn back into a gas. Simply put, and aerosol spray can is a small container (usually steel or aluminum) containing the product to be dispensed and a propellant (normally an inert gas) to force the product through the valve and out of the can. The valve is the heart of the system. Both the product and the propellant are kept inside the package by the valve.

In 1953, Robert H. Abplanalp patented the first clog-free valve for spray cans. In 1950 he founded Precision Valve Corporation. In its first full year of operation, 15 million valves were produced. In 2001 Precision produced over 4 billion valves at 20 facilities around the world. Abplanalp has patented many improvements on his first aerosol spray valve. A good example of this art, which is incorporated into this application for reference, is disclosed in U.S. Pat. No. 4,396,152 "Aerosol Dispenser System."

Examples of the products dispensed from aerosol spray cans include: Insecticides: Ant & Roach killers, House & Garden, Flying Insect Killers, Yard Foggers, Personal Insect repellants, Wasp & Hornet Killers and Total Release Foggers. Household Products: Disinfectant Sprays, Fabric Protectors, Spray Starch, Glass Cleaners, Pre-Wash Sprays, Basin, Tub & Tile Spray, Air Fresheners, Oven Cleaners, Rug Cleaners and Furniture Polish. Personal Care Products: Hair Sprays and low VOC Hair Sprays, Mousse, Antiperspirants, Personal Deodorants, Cologne, Foot Sprays, Shave Creams and Gels. Animal Products: Flea & Tick Killers. Auto & Industrial: Waxes, De-Icers, Degreasers, Carb & Choke, Tire Foam Cleaners, Brake Cleaners, Undercoating, Starting Fluids, Cleaners, Silicones, and Tire Inflators.

The aerosol valve specifications from Precision Valve Corporation for some personal care products (see tables below) show that typical product dispersing orifices range in size from about 0.01 to about 0.03 inches.

| | DISINFECTANT SPRAY Vertical Valves | | |
|---|---|---|---|
| Part | Standard Valve | U.S. 90 Valve | Tilt Valve |
| Stem | 04-1210 .013" | 04-1210 .013" | 04-7710 2 × .013" |
| Stem | 05-0310 Buna | 05-5110 Buna | 05-0710 Buna |
| Gasket | 06-6010 S/S | 06-6010 S/S | 06-7050 S/S |
| Spring | 07-1901 .080" | 07-5380 .080" | 07-1901 .080" |
| Housing | 09-2010 | 09-2010 | 09-2010 |
| Dip Tube | 32-8300*; 42-8180*** | 32-8300*; 42-8180*** | 32-8300*; 42-8180*** |
| Mounting Cup | Flair 01-5848 .020 MBST Short | Flair 01-5848 020" MBST Short | Delta Tilt 21-7221 .013" MB Aqua |
| Actuators | Kosmos 21-8121 .013" | Kosmos 21-8121 .013" | Touchdown Tilt 21-7021 .013" |

-continued

DISINFECTANT SPRAY
Vertical Valves

| Part | Standard Valve | U.S. 90 Valve | Tilt Valve |
|---|---|---|---|
|  | MB Aqua Delta 21-4721 .013" MB Aqua BOF 21-8521 .013" MB Aqua | MB Aqua Delta 21-4721 .013" MB Aqua BOF 21-8521 .013" MB Aqua | MB Aqua |

(*) () (*) See below

FABRIC PROTECTOR
Vertical Valves

| Part | Standard Valve | U.S. 90 Valve | Tilt Valve |
|---|---|---|---|
| Stem | 04-1220 .018" | 04-1220 .018" | 04-7740 2 × .080" |
| Stem Gasket | 05-0310 Buna | 05-5110 Buna | 05-0710 Buna |
| Spring | 06-6010 S/S | 06-6010 S/S | 06-7050 S/S |
| Housing | 07-1901 .080" | 07-5380 .080" | 07-1901 .080" |
| Dip Tube | 09-2010 | 09-2010 | 09-2010 |
| Mounting Cup | 32-8300*; 42-8180*** | 32-3000**; 42-8180*** | 32-8300*; 42-8180*** |
| Actuators | BOF 21-8526 .025" MB Aqua Kosmos 21-8126 .025" MB Aqua Delta 21-4726 .025" MB Aqua | BOF 21-8526 .025" MB Aqua Kosmos 21-8126 .025" MB Aqua Delta 21-4726 .025" MB Aqua | Delta Tilt 21-7226 .025" MB Aqua Touchdown Tilt 21-7026 .025" MB Aqua |

*Conical cup; Epon T/B; Dimpled; PE Sleeve
**Hi-Load cup; Epon T/B; Dimpled; PE Sleeve
***Hi-Load cup; Epon Top; Laminate Bottom; Dimpled

SPRAY STARCH
Vertical Valves

| Part | Standard Valve | U.S. 90 Valve | Tilt Valve |
|---|---|---|---|
| Stem | 04-1270 2 × .020" | 04-1270 2 × .020" | 04-7740 2 × .020" |
| Stem Gasket | 05-0310 Buna | 05-5110 Buna | 05-0710 Buna |
| Spring | 06-6010 S/S | 06-6010 S/S | 06-7050 S/S |
| Housing | 07-1901 .080" | 07-8380 .080" | 07-1901 .080" |
| Dip Tube | 09-2010 | 09-2010 | 09-2010 |
| Mounting Cup | 32-8300*; 42-8180*** | 32-3000**; 42-8180*** | 32-8300*; 42-8180*** |
| Actuators | Flair 01-5848 .020" MBST Kosmos 21-8123 .020" MB Aqua Delta 21-4723 .020" MB Aqua | Flair 01-5840 .020" MBST Kosmos 21-8123 .020" MB Aqua Delta 21-4723 .020" MB Aqua | Delta Tilt 21-7223 .020" MB Concave Touchdown Tilt 21-7023 .020" MB Aqua |

(*) () (*) See Below

GLASS CLEANER

| Part | Standard Valve | U.S. 90 Valve | Tilt Valve |
|---|---|---|---|
| Stem | 04-1270 2 × .020" | 04-1270 2 × .020" | 04-7740 2 × .020" |
| Stem Gasket | 05-0310 Buna | 05-5110 Buna | 05-0710 Buna |
| Spring | 06-6010 S/S | 06-6010 S/S | 06-7050 S/S |
| Housing | 07-1901 .080" | 07-5380 .080" | 07-1901 .080" |
| Dip Tube | 09-2010 | 09-2010 | 09-2010 |
| Mounting Cup | 32-8300*; 42-8180** | 32-3000**; 42-8180*** | 32-8300*; 42-8180*** |
| Actuators | BOF 21-8526 .025" | BOF 21-8526 .025" | Delta Tilt 21-7226 .025" MB Aqua |

GLASS CLEANER

| Part | Standard Valve | U.S. 90 Valve | Tilt Valve |
|---|---|---|---|
| | MB Aqua Kosmos 21-8126 .025" MB Aqua Delta 21-4726 .025" MB Aqua Flair 01-5840 .020" MBST | MB Aqua Kosmos 21-8126 .025" MB Aqua Delta 21-4726 .025" MB Aqua Flair 01-5840 .020" MBST | Touchdown Tilt 21-7026 .025" MB Aqua |

*Conical cup; Epon T/B; Dimpled; PE Sleeve
**Hi-Load cup; Epon T/B; Dimpled; PE Sleeve
***Hi-Load cup; Epon Top; Laminated Bottom; Dimpled

BASIN, TUB & TILE CLEANER
Vertical Valves

| Part | Vertical Valve | Tilt Valve |
|---|---|---|
| Stem | 04-1270 2 × .020" | 04-7740 2 × .020" |
| Stem Gasket | 05-0310 Buna | 05-0710 Buna |
| Spring | 06-6010 S/S | 06-7050 S/S |
| Housing | 27-6508 .040" Up/Down | 27-6508 .040" Up/Down |
| Dip Tube | 09-5310 Large | 09-5310 Large |
| Mounting Cup | 32-8380*; 42-8180*** | 32-3080**; 42-8180*** |
| Actuators | Flair 01-5840 .020" MBST Kosmos 21-8126 .025" MB Aqua Delta 21-4726 .025" MB Aqua BOF 21-8526 .025" MB Aqua | Delta Tilt 21-7226 .025" MB Aqua Touchdown Tilt 21-7126 .025" MB Aqua |

*Conical cup; Epon Top; Uncoated Bottom; Dimpled; PE Sleeve
**Conical cup; Epon Top; Uncoated Bottom; Dimpled; PE Sleeve
***Hi-Load cup; Epon Top; Laminate Bottom; Dimpled

PRE-WASH
Vertical Valves

| Part | Standard Valve | U.S. 90 Valve | Tilt Valve |
|---|---|---|---|
| Stem | 04-1270 2 × .020" | 04-1270 2 × .020" | 04-7740 2 × .020" |
| Stem Gasket | 05-0310 Buna | 05-5110 Buna | 05-0710 Buna |
| Spring | 06-6010 S/S | 06-6010 S/S | 06-7050 S/S |
| Housing | 07-1901 .080" | 07-5380 .080" | 07-1901 .080" |
| Dip Tube | 09-2010 | 09-2010 | 09-2010 |
| Mounting Cup | 32-8300*; 42-8180*** | 32-3000**; 42-8180*** | 32-8300*; 42-8180*** |
| Actuators | Flair 01-5861 .025" MBFT Kosmos 21-2186 .025" MB Aqua BOF 01-8525 .025" MB Aqua | Flair 01-5861 .025" MBFT Kosmos 21-8126 .025" MB Aqua BOF 01-8526 .025" MB Aqua | Delta Tilt 21-7223 .020" MB Aqua Touchdown Tilt 21-7023 .020" MB Aqua |

*Conical cup; Epon T/B; Dimpled: PE Sleeve
**Hi-Load cup; Epon T/B; Dimpled; PE Sleeve
***Hi-Load cup; Epon Top; Laminate Bottom; Dimpled

AIR FRESHENER
Vertical Valves

| Part | Standard Valve | U.S. 90 Valve |
|---|---|---|
| Stem | 04-1270 2 × .020" | 04-1270 2 × .020" |
| Stem Gasket | 05-0330 Neo | 05-5130 Neo |
| Spring | 06-6010 S/S | 06-6010 S/S |
| Housing | 04-3415 .062 × .020" VT Capillary | 07-3894 .050" × .020" VT Capillary |
| Dip Tube | 09-3530 .060" Capillary | 09-3530 .060" Capillary |
| Mounting Cup | 32-8300*; 42-8180*** | 32-3000**; 42-8180*** |

-continued

AIR FRESHENER
Vertical Valves

| Part | Standard Valve | U.S. 90 Valve |
|---|---|---|
| Actuators | Neptune Dome 03-1062 .025" MB Aqua (for 205 N/I Can) 03-0550 .023" S/TFT SBU (For 202 Straight Side) | 03-0550 .023" ST/FT SBU (For 202 Straight Side) |

*Conical cup; Epon T/B; Dimpled: PE Sleeve
**Hi-Load cup; Epon T/B; Dimpled; PE Sleeve
***Hi-Load cup; Epon Top; Laminate Bottom; Dimpled

OVEN CLEANER
Vertical Valves

| Part | Standard Valve | U.S. 90 Valve |
|---|---|---|
| Stem | 04-1240 .024" | 04-1240 .024" |
| Stem Gasket | 05-0310 Buna | 05-5110 Buna |
| Spring | 06-6010 S/S | 06-6010 S/S |
| Housing | 07-1901 .080" | 07-5380 .080" |
| Dip Tube | 09-2010 | 09-2010 |
| Mounting Cup | 32-8380* | 32-3080** |
| Actuators | Alpha 01-5972 .030" MBFT RS | Alpha 01-5972 .030" MBFT RS |

*Conical cup; Epon Top; Uncoated Bottom; Dimpled: PE Sleeve
**Hi-Load cup; Epon Top; Uncoated Bottom; Dimpled; PE Sleeve

RUG CLEANER
Vertical Valves

| Part | Vertical Valve |
|---|---|
| Stem | 04-1248 4 × .024" |
| Stem Gasket | 05-0310 Buna or 0410 Hex Buna |
| Spring | 06-6010 S/S |
| Housing | 07-6937 Inverted W/Tailpiece |
| Dip Tube | None |
| Mounting Cup | 32-8300* |
| Actuators | 01-3596 .013" × .040" Vertical |

*Conical cup; Epon T/B; Dimpled: PE Sleeve

FURNITURE POLISH
Vertical Valves

| Part | Standard Valve | U.S. 90 Valve | Tilt Valve |
|---|---|---|---|
| Stem | 04-1270 2 × .020" | 04-1270 2 × .020" | 04-1270 2 × .020" |
| Stem Gasket | 05-0310 Buna | 05-5110 Buna | 05-0710 Buna |
| Spring | 06-6010 S/S | 06-6010 S/S | 06-7050 S/S |
| Housing | 07-1901 .080" | 07-5380 .080" | 07-1901 .080" |
| Dip Tube | 09-2010 | 09-2010 | 09-2010 |
| Mounting Cup | 32-8300*; 42-8180*** | 32-3000**; 42-8180*** | 32-8300"; 42-8180*** |
| Actuators | Flair 01-5840 .020" MBST Delta 21-4726 .025" MB Aqua Kosmos 21-8126 .025" MB Aqua BOF 21-8526 .025" MB Aqua | Flair 01-5840 .020" MBST Delta 21-4726 .025" MB Aqua Kosmos 21-8126 .025" MB Aqua BOF 21-8526 .025" MB Aqua | Delta Tilt 21-7223 .020" MB Aqua Touchdown Tilt 21-7023 .020" MB Aqua |

*Conical cup; Epon T/B; Dimpled: PE Sleeve
**Hi-Load cup; Epon T/B; Dimpled; PE Sleeve
***Hi-Load cup; Epon Top; Laminate Bottom; Dimpled Manual Trigger Sprays:

In 1958 Tetsuya Tada of Tokyo, Japan, invented the manual trigger spray. Tada founded Canyon Corporation, Tokyo, which supplies consumer and industrial trigger sprays worldwide. Two good examples of manual trigger sprays, which are incorporated into this application for reference, are disclosed in Tada's U.S. Pat. No. 3,701,478 "Hand Sprayer" and U.S. Pat. No. 4,153,203 "Trigger Type Sprayer."

Manual trigger sprays are an extremely useful type of machine and an excellent demonstration of basic plumbing principles. A spray-bottle head is made up of only a few parts. It has a trigger lever, which activates a small pump. This pump is attached to a plastic tube that draws cleaning fluid from the bottom of the reservoir. The pump forces this liquid down a narrow barrel and out a small hole at the gun's muzzle. The hole, or nozzle, serves to focus the flowing liquid so that it forms a concentrated stream.

The only complex element in this design is the fluid pump, and it's about as simple as they come. The main moving element is a piston, housed inside a cylinder. Inside the cylinder, there is a small spring. To operate the pump, you pull the trigger back, pushing the piston into the cylinder. The moving piston compresses the spring, so when you release the trigger, the piston is pushed back out of the cylinder. These two strokes of the piston, into the cylinder and out again, constitute the entire pump cycle.

The downstroke, the piston pushing in, shrinks the area of the cylinder, forcing fluid out of the pump. The upstroke, the spring pushing the piston back out, expands the cylinder area, sucking fluid into the pump. In a spray bottle, you need to suck cleaning fluid in from the reservoir below and force it out 
through the barrel above. In order to get all of the fluid moving through the barrel, the pump must only force the fluid up—it cannot force the fluid back into the reservoir. In other words, the fluid must move through the pump in only one direction.

The device that makes this possible is called a one-way valve. A spray bottle has two one-way valves in the pumping system: one between the pump and the reservoir and one between the pump and the nozzle. Typically, the valve between the pump and the reservoir consists of a tiny rubber ball that rests neatly inside a small seal. The sides of the seal are angled so that the ball won't fall through. Depending on the design, either gravity or a small spring holds this ball against the seal so that the water passageway is blocked off when you are not pumping. When the piston moves out (when you release the trigger), the expanding area of the cylinder sucks on the fluid below, pulling the ball up out of the seal. Since the ball is lifted up, fluid is free to flow from the reservoir. But when you squeeze the trigger, the outward force of the moving fluid pushes the ball into the seal, blocking off the passageway to the reservoir. Consequently, the pressurized fluid is pushed only into the barrel.

In the spray mechanism, the one-way valve between the pump and the nozzle is a sort of cup, which fits over the end of the barrel. On the upstroke, the inward pressure from the pump pulls the cup against the barrel, so air can't flow in through the nozzle. On the downstroke, the fluid pushing out lifts the cup off the barrel slightly and flows on through the nozzle. Without this second one-way valve, the pump system wouldn't be able to draw fluid up from the reservoir because there would be no suction (no drop in air pressure). The upstroke wouldn't lower the air pressure in the pump; it would only draw in more air to maintain that pressure.

This valve also works as a shut-off system. When you screw the nozzle piece in, it pushes the valve cup tightly against the barrel, so you can't force any liquid out. When you loosen the nozzle piece, there is enough room for the valve cup to move back and forth. When you use a spray bottle for the first time, you have to squeeze the trigger a couple of times to spray any fluid. There are two things causing this delay:

Before you start pumping, the gun is set for a downstroke, not an upstroke (the piston is sitting outside the cylinder). When you first pull the trigger back, and the piston pushes in, there is no liquid to pump out; there is only air in the cylinder chamber. The piston has to slide out to suck any fluid from the reservoir.

On this first upstroke, the pump starts sucking the cleaning liquid from the reservoir. But it also sucks in any air sitting in the plastic tube leading to the reservoir. Before you can start spraying the cleaning liquid, you have to drive this air through the pump mechanism. This may take a couple of downstrokes and upstrokes.

This simple pump design, called a reciprocating piston pump, is used for a variety of tasks. In addition to pressurizing water, air and many other fluids, this design can also extract water and oil from underground. We even have reciprocating pumps built into our bodies: Your heart expands to draw low-pressure blood in through one one-way valve and contracts to force high-pressure blood through another one-way valve, back into your body. The same basic mechanism that makes an ordinary spray bottle work also serves to keep you alive!

Examples of consumer and industrial manual spray trigger pump specifications, from the Canyon Corporation are:

| | |
|---|---|
| Nozzle orifice | □ 0.6 mm |
| Spray output per stroke | 0.7 gram ± 0.1 gram (Using distilled water)<br>1.0 gram ± 0.1 gram (Using distilled water) |
| Spray pattern | □ 180 mm ± 40 mm (At distance of 200 mm) |
| Spray Angle | 38.6°~57.6° |
| Durability | More than 10,000 continuous trigger pulls. (Water.) |
| Weight | 25.1 gram ± 1.5 gram (LB = 150 mm) |

Example of industrial spray trigger pump specifications:

| | |
|---|---|
| Nozzle orifice | □ 0.6 mm |
| Spray output per stroke | 2.4 gram ± 0.45 gram (Using distilled pure water) |
| Spray pattern | □ 200 mm ± 30 mm (At distance of 100 mm) |
| Spray Angle | 0°~90° |
| Durability | More than 50,000 continuous trigger pulls. (Water.) |
| Weight | 76 gram ± 1.5 gram (LB = 230 mm) |

The nozzle orifice of these trigger pumps is 0.60 mm, which is 0.023 inches. It should be noted that this is about the same diameter as the nozzle orifices of the aerosol pressure valves described above. However, trigger spray valves operate at lower pressure than aerosol can valves, thus low dispensed product viscosity is even more necessary to the proper operation of these hand actuated sprayers. In addition to being forced through this small nozzle aperture, the dispensed product must pass through the moving parts of the pump including the ball valve, which may have even smaller working clearances.

In order to spray moderately viscous gel-type hair-conditioning compositions, the gel must be a thin aqueous solution or must be a dilute hydrocarbon water emulsion. An example is disclosed in U.S. Pat. No. 5,340,570, which teaches incorporation of an alkyl polyol and a water soluble or emulsifiable silicone based compound into the gel, in a 95% water solution to obtain a satisfactory liquefied spray mist through a pump nozzle having apertures ranging between about 0.01 and 0.03 mm.

The prior art teaches the addition of diblock and triblock polymers to increase viscosity of a gel composition. An example of this is disclosed in U.S. Pat. No. 6,451,299 B1 "Synergisic Effect on Viscosity Between Associative Polymers."

Child resistant packaging of product containing low viscosity hydrocarbons:

Effective Oct. 25, 2002 the Consumer Product Safety Commission adopted final Rules on Household Products Containing Hydrocarbons. (Federal Register: Oct. 25, 2001 (Volume 66, Number 207)][Rules and Regulations][Page 53951-53957] 16 CFR 1700.

Promulgated under authority of the Poison Prevention Packaging Act (PPPA), these new rules require child-resistant (CR) packaging for certain products that contain low-viscosity hydrocarbons. This requirement is intended to protect children under five years of age from serious injury associated with aspiration of hydrocarbon products. The requirement applies to certain prepackaged nonemulsion-type liquid household chemical products, including drugs and cosmetics, that contain ten (10) percent or more hydrocarbons by weight and have a viscosity of less than one hundred (100) Saybolt Universal Seconds (SUS) at 100 deg. F. For purposes of these rules, hydrocarbons are defined as compounds that consist solely of carbon and hydrogen. For a product that contains multiple hydrocarbons, the total percentage of hydrocarbons in the product is the sum of the percentages by weight of the individual hydrocarbon components.

Saybolt Universal second (SUS) is a unit of kinematic viscosity given by readings on Saybolt viscometers. The Saybolt Universal viscometer is used for liquids having viscosities below 1000 centistokes (or 10 stokes. Saybolt seconds are considered obsolete, but they have been used traditionally in the petroleum industry and are common in technical articles. A "Stoke" (St) is a unit of kinematic viscosity ($cm^2 s^{-1}$). The SI unit of kinematic viscosity is $m^2 s^{-1}$ (=10000 stoke).

Direct aspiration into the lung, or aspiration during vomiting, of small amounts of petroleum distillates and other similar hydrocarbon solvents can result in chemical pneumonia, pulmonary damage, and death. These chemicals are the primary ingredients in a multitude of consumer products to which children have access. The viscosity of a hydrocarbon-containing product contributes to its potential toxicity. Viscosity is the measurement of the ability of a liquid to flow. Liquids with high viscosities are thick or "syrupy." Liquids with low viscosities are more "watery." Products with low viscosity pose a greater risk of aspiration into the lungs. Under regulations issued pursuant to the Federal Hazardous Substances Act (FHSA), 15. U.S.C. 1261-1278, the CPSC regulates the labeling of hazardous household substances containing 10 percent or more by weight of petroleum distillate hydrocarbons because these products may cause injury or illness if ingested. 16 CFR 1500.14. The PPPA regulations in effect as of this date also require child-resistant packaging for certain household products containing petroleum distillates. 16 CFR 1700.14. Under these regulations, the specified consumer products containing 10 percent or more by weight of petroleum distillates, and having viscosities less than 100 Saybolt Universal Seconds (SUS) at 100 deg. F., are subject to child-resistant packaging standards. These PPPA-regulated products include prepackaged liquid kindling and illuminating preparations (e.g., lighter fluid) (16 CFR 1700.14(a)(7)), prepackaged solvents for paint or other similar surface-coating materials (e.g., paint thinners)(16 CFR 1700.14(a)(15)), and nonemulsion liquid furniture polish (16 CFR 1700.14(a)(2)).

Many household substances contain more than ten percent hydrocarbons and have viscosities below 100 SUS at 100 deg. F. The low viscosity is desirable so these products may be dispensed through an pressurized aerosol spray valve or a manual trigger spray. A good example is spray furniture polish. Under these new rules, the manual trigger spray containing these products must be equipped with child resistant caps, which are expensive. Alternatively the product may be modified to have a viscosity over 100 SUS, but the higher viscosity product does not flow well through a trigger spray or aerosol spray valve.

BRIEF SUMMARY OF THE INVENTION

The present invention is a gel formed by mixing a product containing at least one hydrocarbon base with at least one diblock polymer. The hydrocarbon base component of the gel may be one or more aliphatic hydrocarbons, whose structure may be straight, branched or cyclic, or it may be one or more aromatic hydrocarbons; or it may be a mixture of aliphatic and aromatic hydrocarbons. The preferred embodiment of the present invention uses aliphatic hydrocarbons.

To be shear thinning the composition taught by the present invention must use a diblock copolymer, as is shown in more detail in the discussion and examples below. If a triblock copolymer is used instead of a diblock copolymer, the results is a gel that is shear thickening, i.e. a gel whose viscosity increases when the composition is subjected to shear forces.

One example of a hydrocarbon gel that contains triblock copolymer is Versagel® M1600, which is a mineral oil gel composition sold commercially by Penreco® of Houston, Tex. Three recently published patent applications (US Patent Application Publications US 2003/0083209 A1[published May 1, 2003]; US 2003/0075073 A1 [published Apr. 24, 2003] and US 2003/0083208 A1 [published May 1, 2003] state and claim that Versagel® M1600 gel is a thixotropic thickener that can be used to make shear thinning gelled products. This is not the case. Versagel® M1600 is neither thixotropic nor shear thinning. It is, in fact, strongly shear thickening. In its relaxed state (when it is not under shear stress) the Versagel® M1600 gel mentioned in the three above referenced published patent applications has a viscosity at 22.5 degrees C. measured at 1 rpm of 373,000 cPs. If this Versagel M1600 is subjected to shear stress by stirring it at 12 RPM with a laboratory mixer for one minute, then this gel's viscosity increases to more than 600,000 cPs. All of these measurements were made at 22.5 degrees centigrade at 1 rpm using a Brookfield programmable DV-II+ viscometer using a T bar (T-C) spindle.

If a triblock/diblock combination of copolymers is used, the resulting gel is either shear thickening or Newtonian. If a star polymer is use, the resulting gel is Newtonian. A Newtonian fluid is a viscous fluid whose shear stresses are a linear function of the fluid strain rate. Mathematically, this can be expressed as: $t_{ij}=K_{ijqp}*D_{pq}$, where $t_{ij}$ is the shear stress component, and $D_{pq}$ are fluid strain rate components. A Stokesian (or non-Newtonian) fluid is a viscous fluid whose shear stresses are a non-linear function of the fluid strain rate. The gel composition of the present invention using only diblock copolymer is a Stokesian fluid, specifically it is pseudoplastic, not thixotropic. Thixotropic materials exhibit a time-dependent response to shear strain rate over a longer period than that associated with changes in the shear strain rate. They may liquefy on being shaken and then solidify (or not) when this has stopped. Pseudoplastic materials such as the hydrocarbon gel compositions taught by the present invention instantaneously decrease in viscosity with increase in shear strain rate (e.g. flow) and are therefore easier to pump and mix. The gelled hydrocarbon embodiments of the present invention that are made with a combination of diblock copolymer and a secondary amino acid gelling agent are thixotropic, not pseudoplastic. The thixotropic embodiments of the present invention shear thinning and have industrial utility in personal care products such as creams, lotions and massage gels.

The hydrocarbon component of the present invention may be a naturally occurring mixture of hydrocarbons having a diverse range of structures and molecular weights, or it may be a synthetic hydrocarbon having one or more structures and any desired range of molecular weight distribution. The diblock copolymer component of the invention used in trigger sprays should have a molecular weight between about 100,000 and about 500,000, with a preferred embodiment being at about 200,000. The diblock copolymer component of the invention that is dispensed through aerosol can valves may have a wider range of higher molecular weight. This selection of the proper range of molecular weights for the diblock component of the gel is a function of the pressure available in the dispensing mechanism. The higher the available dispensing pressure, the broader the range of molecular weights of the diblock that can be used in the present invention. The selection of the proper diblock polymer for each product application is within the skill of the art of the formulating chemist.

The gel composition of the present invention, has a viscosity substantially higher than the hydrocarbon base product without the diblock polymer. Said gel exhibits an instantaneous reduction in viscosity when it flows through a small orifice, such as a trigger spray nozzle. This shear thinning is reversible. After exiting the trigger spray, the shear force on the gel is removed and the gel immediately regains its higher viscosity.

One benefit of the present invention is to allow formation of spray gels from a wide range of hydrocarbon containing products, including by way or example, and not of limitation: Conosol®, Drakesol® and Drakeol® hydrocarbon oils and solvents made by Penreco, Houston, Tex.; gasoline and other hydrocarbon containing fuels and lubricants such as diesel oil, jet fuel; and low viscosity specialty hydrocarbon products including penetrating oils and solvents sold under the trademarks Liquid Wrench® a and WD-40®.

The gelled hydrocarbons taught by the present invention also may be used as in the formulation of personal care products such as suntan lotion, beauty creams and massage gels. The spray gel of the present invention may use one or more of a wide variety of diblock copolymers such as the hydrogenated and unhydrogenated diblock copolymers manufactured under the trademark Kraton®. The preferred embodiment of the present invention for use in trigger sprays uses Kraton® G-1702. The preferred embodiment of the present invention is from about 0.5 to about 12 weight percent diblock copolymer. In some high pressure spray applications the amount of diblock can be as high as 30 weight percent.

Another benefit of the present invention is to allow the formation of a gel that instantaneously lowers its viscosity when it is subject to shear loads, for use as gel lubricants, penetrating oils and the like.

A further benefit of the present invention is to allow formation of spray gels containing hydrocarbons used in household products such as furniture polish, automotive engine cleaner, tire cleaners, and health and beauty products such as sunscreens and beauty creams. These gelled products spray well because of the present invention's instantaneous low viscosity when it flows through a trigger spray or other small orifice. At the same time these products hydrocarbon containing household products gelled according to the present invention may be made so their bulk viscosity in the bottle or can equal to or greater than 100 SUS at 100 deg. F. This allows them to avoid the expense of child resistant packaging. Another benefit is that these products made with the gel taught by the present invention regain a high viscosity after being sprayed, which reduce run and dripping.

Yet another benefit of the present invention is that the spray gel it teaches can contain insecticide and be used as insect spray. In this use, the hydrocarbon containing insect spray is thick enough in the spray bottle to avoid the requirement of child resistant packaging, sprays well through a trigger spray or aerosol valve because of the instantaneous viscosity change of the present invention, and then regains its higher viscosity immediately on the target to reduce dripping and allow for more of the insect killing product to cling to and stay on the target to kill more insects for a longer time.

Another benefit of the present invention is to provide viscosity of spraying gels for manual trigger sprays that can vary from about 50 SUS at 100° F. to about 1000 SUS at 100° F. For good spraying pattern the viscosity of the gels should be in the range of about 50-400 SUS at 100F. Best spraying properties will have gels with a viscosity of about 100 to about 350 SUS at 100° F. The range of viscosities that may be used at the higher pressure available in aerosol spray cans may be higher than for manual trigger sprays, depending on the propellant pressure available in the aerosol spray can. For aerosol cans, the preferred viscosity range is from about 100 SUS to about 300,000 SUS. This range may be adjusted to the specific product and application of the dispensed product.

Yet a further benefit of the present invention is to reduce the vapor pressure of a hydrocarbon product by providing a hydrocarbon product as a gel. Reduction in hydrocarbon product vapor pressure lowers the total amount of volatile organic compounds (VOC) that are released into to the environment by the product in a given time at a given temperature and pressure. One example of this benefit is that gelled fuel in an empty gas tank would have a lower vapor pressure, i.e. less VOC per unit volume of the gas tank, and thus would release less VOC pollution into the atmosphere during refueling, when the VOC vapor in the gas tank is forced out of the tank by the fuel flowing into the tank.

Yet another advantage of the hydrocarbon containing gel taught by the present invention is that the lower vapor pressure of the present invention lowers the risk of hydrocarbon-air explosion, while at the same time providing a gelled hydrocarbon product that can flow through pumps, filters and small orifices, such as the jets in an automobile carburetor, pores in fuel filters and fuel injectors in reciprocating gasoline or diesel engines, which may be stationary or may be in a car, truck or other mobile machinery. This advantage includes use of the present invention to provide a sprayable hydrocarbon containing gel with reduced vapor pressure to make fuel air explosion less likely while retaining the ability to flow properly through fuel spray nozzles in an aircraft reciprocating or turbojet engine or through the fuel injector plate orifices in a expendable or reusable rocket engine.

DETAILED DESCRIPTION OF THE INVENTION

Commercially available diblock copolymers can be used to make the shear thinning gel compositions of the present invention. For example, various grades of copolymers sold under the trade name of Kraton® from Kraton Polymers, Houston, Tex. can be used. In some embodiments, the diblock copolymers are one or more of Kraton® G-1701 and Kraton® G-1702. Both Kraton® G-1701 and Kraton® G-1702 are diblock copolymers comprising hard styrene blocks and saturated poly(ethylene/propylene) blocks. Kraton® G-1701 has a specific gravity of about 0.91, and is reported to have a tensile strength of about 300 psi as measured on films cast from toluene, with Instron jaw separation of 10 inches per minute at a temperature of 25° C. and dumbbell specifications cut with ASTM die D. The styrene to rubber content of Kraton® G-1701 is reported by the manufacturer to be about 37:63, and the Brookfield viscosity is about greater than 50,000 cps (toluene solution, cps at 77° F., 25% by weight). The Shore A hardness is about 72. Kraton® G-1702 has a styrene content of about 28% and a Shore A hardness of about 75. In addition, copolymers sold under the trade name of Vector® available from Dexco and Septon® from Kuraray also may be used. Table I lists some commercially available block copolymers which may be used in embodiments of the invention.

TABLE I

| Copolymer | Block Type | Polystyrene Content(%) | Comment |
|---|---|---|---|
| Kraton ® G 1702 | SEP | 28 | Hydrogenated diblock |
| Kraton ® G 1701 | SEP | 37 | Hydrogenated diblock |
| Septon ® 1001 | SEP | 35 | Hydrogenated diblock |
| Vector ® 6030 | SB | 30 | Unsaturated diblock |
| Solprene ® 1430 | SB | 40 | Unsaturated diblock |

Kraton® G-1702 is the preferred for use with gels for trigger sprays, per the examples set out below. The remaining examples of diblock polymers may be used with gel of greater viscosity for use with trigger sprays or aerosol spray valves.

Commercially available hydrocarbon oils and solvents, such as those made by Penreco under the trademarks Conosol and Drakesol may be use as the hydrocarbon base for the shear thinning gels of the present invention. As is discussed in more detail below, a wide range of hydrocarbon containing chemicals may be used as the hydrocarbon base for the gels taught by the present invention.

Penreco Conosol 260 is a high-purity, low-odor aliphatic solvent that is composed primarily of $C_{13}$-$C_{20}$ isoparaffinic and cycloparaffinic hydrocarbons. It is a low-toxicity product that contains less than 0.5% aromatics, and it has a higher solvent strength than competitive aliphatic solvents. Conosol 260 is environmentally friendly and meets numerous FDA regulations (21 CFR) for direct and indirect food additives. Penreco has determined that this product meets the low vapor pressure (LVP) VOC exemption for consumer products as set by the California Air Resources Board.

The chemical composition of Penreco Drakesols is predominantly saturated hydrocarbons. These compounds may be branched, straight chain or saturated cyclic structures. The aromatic content is very low and olefins are almost nonexistent.

Properties of some Penreco technical mineral oils that may be used with the present invention are given in the table below.

| Technical Mineral Oil | Typical Values | | Typical Properties | | | |
|---|---|---|---|---|---|---|
| | Viscosity ASTM D 445 | | Specific Gravity ASTM D 4052 | Flash Point ASTM D | | Pour Point ASTM D 97 |
| | SUS @ 100° F. | CST @ 40° C. | @ 77° F. | ° F. | ° C. | ° F. | ° C. |
| Parol ® 100 | 95/105 | 17.7/20.2 | .838/.864 | 360 | 182 | 15 | −9 |
| Parol ® 80 | 75/90 | 13.2/17.0 | .830/.857 | 355 | 179 | 15 | −9 |
| Parol ® 70 | 65/75 | 10.8/13.6 | .826/.847 | 350 | 177 | 15 | −9 |
| 4463 Oil | 42/59 | — | — | 310 | 154 | 50 | 10 |
| 6970 Oil | 50/75 | — | — | 315 | 157 | 15 | −9 |
| 6970 LP Oil | 50/75 | — | — | 330 | 165 | −10 | −18 |

Any hydrocarbon oil or chemical with similar properties may be used in the present invention. The weight percent of the copolymer is selected in order to yield the desired viscosity of gel in the present invention. The viscosity of spraying gels can vary from 50 SUS at 100 degrees F. to 1000 SUS at 100 degrees F. For good spraying pattern the viscosity of the gels should be in the range of 50-400 SUS at 100 degrees F. Best spraying properties will have gels with a viscosity of 100 to about 350 SUS at 100 degrees F. In the preferred embodiment of the invention, the weight percent of copolymer is from about half a weight percent to about two weight percent. This yields a spray gel that has a viscosity range from about 100 SUS to about 400 SUS, whereby the spray gel can be used in a manual trigger spray. Higher viscosities embodiments of the present invention may be used with aerosol pressure valve dispensing systems because they operate at higher pressures.

The present invention may contain small amounts of antioxidants such as BHT. It may also contain additional gelling agents, for example amino acid gelling agents such as N-lauroyl Glutamic Acid Di-N-Butylamide [this material is sold under the trade name "GP-1" by Ajinomoto USA Inc. and it is also sold under the trade name "LGB" by Hampshire Chemical Corporation a subsidiary of Dow Chemical Company] However, the shear thinning gel composition of the present invention does not have to contain such antioxidants or additional gelling agents.

The present invention may also contain long chain alcohols, fragrances, insecticides, waxes, other solvents, oils and long chain organic acids, long chain organic bases, mineral oils, oils derived from vegetables and fruits, and animal derived oils and fats, long chain esters, and generally any material that is compatible with or comprises hydrocarbons, having carbon chain length preferably from about C6 to about C20 for liquid spray gels, and up to about C40 for gels that are dispensed by high pressure spray apparatus. These additional components may be blends from natural or synthetic feedstocks, or may be pure chemicals.

Such additional ingredients are routinely added to petroleum distillates to produce formulations of household products such as furniture oil or baby oil so as to permit their application by a trigger spray or pressure spray can.

EXAMPLES

The following are examples of the gels that are representative of the present invention. All values are in weight percent.

Example Table 1

Gelled Mineral Oil

| Lab ID | #834-67-1 | #834-67-2 | #834-67-3 | #834-67-4 |
|---|---|---|---|---|
| 4463 Oil | 99.26 | — | 99.98 | 98.48 |
| Drakeol 5 | — | 99.26 | — | — |
| BHT | 0.02 | 0.02 | 0.02 | 0.02 |
| Kraton G 1702 | 0.72 | 0.72 | — | — |
| Kraton G 1701 | — | — | 1.00 | 1.50 |

Procedure: Heat the hydrocarbon oil and antioxidant to 50-60° C. Add the polymer with small increments and raise the temperature to 100-105° C. Mix until lump free to achieve a gel that has an excellent clarity.

Example Table 2

Gelled Mineral Oil

|  | #834-70-1 | #834-70-2 | #834-70-3 | #834-70-10 | #834-70-11 | #834-70-12 |
|---|---|---|---|---|---|---|
| 4463 Oil | 29.7823 | 29.739 | 29.694 | 29.739 | 29.694 | 29.634 |
| P65 Oil | 69.4922 | 69.391 | 69.286 | 69.391 | 69.286 | 69.146 |
| BHT | 0.02 | 0.02 | 0.02 | 0.02 | 0.02 | 0.02 |
| Kraton G 1702 | 0.7055 | 0.85 | 1.00 | — | — | — |
| Kraton G 1701 | — | — | — | 0.85 | 1.00 | 1.20 |

Procedure: Heat the hydrocarbon oil and antioxidant to 50-60° C. Add the polymer with small increments and raise the temperature to 100-105° C. Mix until lump free to achieve a gel that has an excellent clarity.

Examples Table 3

Gelled Mineral Oil

|  | #834-71-1 | #834-71-2 |
|---|---|---|
| 4463 Oil | 29.76 |  |
| P65 Oil | 69.44 |  |
| BHT | 0.02 | 0.02 |
| Kraton G 1702 | 0.78 | 0.85 |
| Drakeol 5 |  | 99.20 |

Procedure: Heat the hydrocarbon oil and antioxidant to 50-60° C. Add the polymer with small increments and raise the temperature to 100-105° C. Mix until lump free to achieve a gel that has an excellent clarity.

Examples Table 4

Gelled Mineral Oil

|  | #1004-41-1 | #1004-41-2 |
|---|---|---|
| Drakeol 5 | 91.38 | 89.68 |
| GP-1 | 0.30 | 2.00 |
| BHT | 0.02 | 0.02 |
| Kraton G 1702 | 8.30 | 8.30 |

Procedure: Heat the hydrocarbon oil and antioxidant to 50-60° C. Add the polymer with small increments and raise the temperature to 100-105° C. Mix until lump free to achieve a gel. 1004-41-1 is a clear gel. 1004-41-2 is a translucent gel.

Examples Table 5

Gelled Mineral Oil

|  | #1004-24-1 | #1004-24-2 | #1004-41-1 | #1004-41-2 |
|---|---|---|---|---|
| Drakeol 7 | 98.48 | 97.98 | 91.38 | 89.69 |
| BHT | 0.02 | 0.02 | 0.02 | 0.02 |
| Kraton G 1702 | 1.50 | 2.00 | 8.3 | 8.3 |
| GP-1 |  |  | 0.3 | 2.00 |

Procedure: For #1004-24-1 and #1004-24-2 heat the hydrocarbon oil and antioxidant to 50-60° C. Add the polymer with small increments and raise the temperature to 100-105° C. Mix until lump free to achieve a clear pseudoplastic shear thinning gel. For #1004-41-1 and #1004-41-2 heat the hydrocarbon oil and antioxidant to 50-60° C. Add the polymer with small increments and raise the temperature to 100-105° C. Mix until lump free. Increase the temperature to 140 degrees C. and add the GP-1. Mix until lump free. Produces a thick shear thinning thixotropic gel that is clear (41-1) and one that is translucent (41-2.)

Examples Table 6

Gelled Ester

|  | 1004-24-3 | 1004-24-4 | 1004-24-5 | 1004-24-6 | 1004-41-3 | 1004-41-4 |
|---|---|---|---|---|---|---|
| IPP | 96.95 | 94.95 | 92.95 | 98.45 | 91.38 | 89.68 |
| BHT | 0.05 | 0.05 | 0.05 | 0.05 | 0.02 | 0.02 |
| Kraton G 1702 | 3.00 | 5.00 | 7.00 | 1.50 | 8.30 | 8.30 |
| GP-1 | — | — | — | — | 0.30 | 2.00 |

Procedure: For #1004-24-3, #1004-24-4, #1004-24-5 and #1004-24-6 heat the hydrocarbon oil and antioxidant to 50-60° C. Add the polymer with small increments and raise the temperature to 100-105° C. Mix until lump free to achieve a clear pseudoplastic shear thinning gel. For #1004-41-3 and #1004-41-4 heat the hydrocarbon oil and antioxidant to 50-60° C. Add the polymer with small increments and raise the temperature to 100-105° C. Mix until lump free. Increase the temperature to 140 degrees C. and add the GP-1. Mix until lump free. Produces a thick shear thinning thixotropic gel that is clear (41-3) and one that is translucent (41-4.)

Figure 1:
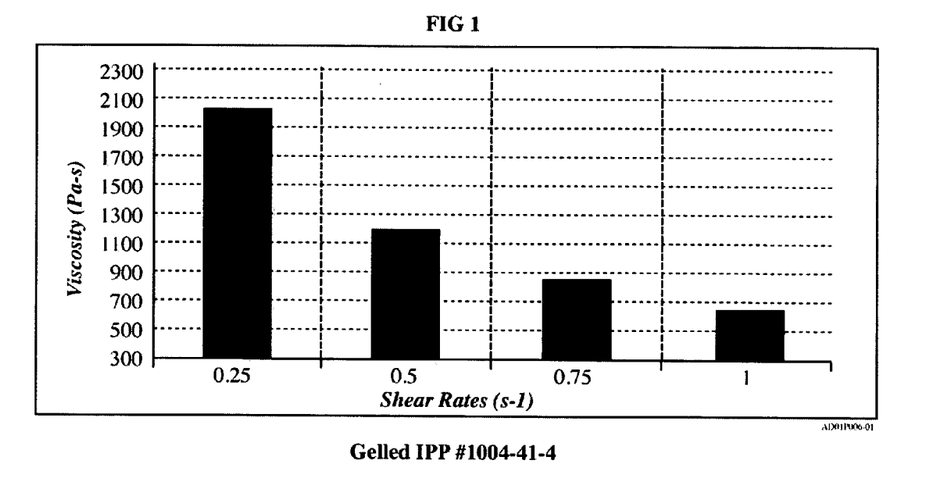
FIG. 1 is a bar graph plotting shear rate against viscosity for an embodiment of the present invention made with a hydrocarbon ester.

Shear thinning test data for example #1004-41-4 is shown in the summary and detail tables below and in the bar graph in FIG. 1. These tests were conducted by an independent testing laboratory, Fluid Dynamics, Inc., Flemington Industrial Park, 45 River Road Bldg 500 Flemington, N.J. 08822. It should be understood that IPP is used only as an example of long chain esters. The present invention may be used to gel any long carbon chain ester from C6 to about C40. These gels will be shear thinning.

| Shear Test Data | Viscosity (Pa-s) | Shear Rate (s − 1) |
|---|---|---|
| Example (summary) | 2044.39 | 0.25 |
| Lab ID #1004-41-4 | 1187.83 | 0.5 |
|  | 848.77 | 0.75 |
|  | 649.28 | 1 |

Shear Test—Detailed Test Data for Example #1004-41-4

| Rate s − 1 | Shear Stress Pa | Viscosity Pa-s | Temp ° C. | time S |
|---|---|---|---|---|
| 0.00 | 0.00 | DIV0 | 24.7 | 0.00 |
| 0.01 | 24.49 | 1514.750 | 24.7 | 0.60 |
| 0.02 | 93.27 | 4145.260 | 24.8 | 1.28 |
| 0.03 | 143.34 | 4575.700 | 24.7 | 1.80 |
| 0.04 | 189.33 | 4590.570 | 24.7 | 2.40 |
| 0.05 | 224.39 | 4386.340 | 24.7 | 3.00 |
| 0.06 | 254.15 | 4150.000 | 24.7 | 3.60 |
| 0.07 | 282.52 | 3903.970 | 24.7 | 4.28 |
| 0.08 | 305.29 | 3700.460 | 24.7 | 4.88 |
| 0.09 | 324.29 | 3510.700 | 24.8 | 5.48 |
| 0.10 | 342.67 | 3343.080 | 24.7 | 6.08 |
| 0.11 | 359.84 | 3201.660 | 24.7 | 6.68 |
| 0.12 | 375.19 | 3062.780 | 24.8 | 7.28 |
| 0.13 | 390.71 | 2924.060 | 24.7 | 7.95 |
| 0.15 | 405.80 | 2798.590 | 24.7 | 8.63 |
| 0.15 | 416.16 | 2707.910 | 24.7 | 9.15 |
| 0.16 | 427.82 | 2612.720 | 24.8 | 9.75 |
| 0.17 | 439.80 | 2532.180 | 24.7 | 10.35 |
| 0.18 | 449.00 | 2443.600 | 24.7 | 10.95 |
| 0.20 | 460.32 | 2361.580 | 24.8 | 11.63 |
| 0.21 | 468.85 | 2287.060 | 24.7 | 12.23 |
| 0.22 | 478.69 | 2227.160 | 24.7 | 12.83 |
| 0.23 | 486.34 | 2161.500 | 24.7 | 13.43 |
| 0.24 | 492.50 | 2096.370 | 24.7 | 14.03 |
| 0.25 | 500.88 | 2044.390 | 24.7 | 14.63 |
| 0.26 | 507.30 | 1980.410 | 24.7 | 15.30 |
| 0.27 | 514.39 | 1922.950 | 24.7 | 15.98 |
| 0.28 | 521.52 | 1888.190 | 24.7 | 16.50 |
| 0.29 | 526.83 | 1840.470 | 24.7 | 17.10 |
| 0.30 | 532.84 | 1798.860 | 24.7 | 17.70 |
| 0.31 | 537.48 | 1755.050 | 24.7 | 18.30 |
| 0.32 | 544.37 | 1714.830 | 24.7 | 18.98 |
| 0.33 | 549.35 | 1677.390 | 24.8 | 19.58 |
| 0.34 | 553.32 | 1639.740 | 24.7 | 20.18 |
| 0.35 | 558.00 | 1605.740 | 24.7 | 20.78 |
| 0.36 | 561.99 | 1572.190 | 24.7 | 21.38 |
| 0.37 | 567.93 | 1545.400 | 24.8 | 21.98 |
| 0.38 | 571.21 | 1508.420 | 24.7 | 22.65 |
| 0.39 | 574.28 | 1472.520 | 24.8 | 23.33 |
| 0.40 | 575.75 | 1444.010 | 24.7 | 23.85 |
| 0.41 | 578.64 | 1415.640 | 24.7 | 24.45 |
| 0.42 | 580.56 | 1386.520 | 24.7 | 25.05 |
| 0.43 | 580.92 | 1354.920 | 24.7 | 25.65 |
| 0.44 | 585.69 | 1331.250 | 24.7 | 26.33 |
| 0.45 | 586.76 | 1303.910 | 24.7 | 26.93 |
| 0.46 | 589.20 | 1281.010 | 24.7 | 27.53 |

-continued

| Rate s − 1 | Shear Stress Pa | Viscosity Pa-s | Temp ° C. | time S |
|---|---|---|---|---|
| 0.47 | 589.59 | 1254.440 | 24.8 | 28.13 |
| 0.48 | 591.41 | 1232.220 | 24.7 | 28.73 |
| 0.49 | 591.77 | 1207.700 | 24.8 | 29.33 |
| 0.50 | 593.87 | 1187.830 | 24.7 | 29.93 |
| 0.51 | 595.37 | 1164.560 | 24.7 | 30.60 |
| 0.52 | 595.70 | 1142.880 | 24.7 | 31.20 |
| 0.53 | 598.68 | 1126.930 | 24.8 | 31.80 |
| 0.54 | 600.58 | 1109.670 | 24.7 | 32.40 |
| 0.55 | 602.74 | 1093.410 | 24.7 | 33.00 |
| 0.56 | 605.04 | 1078.060 | 24.7 | 33.60 |
| 0.57 | 607.70 | 1061.500 | 24.7 | 34.28 |
| 0.58 | 609.04 | 1045.590 | 24.7 | 34.88 |
| 0.59 | 611.56 | 1032.170 | 24.8 | 35.48 |
| 0.60 | 612.95 | 1017.380 | 24.7 | 36.08 |
| 0.61 | 614.90 | 1003.920 | 24.7 | 36.68 |
| 0.62 | 616.72 | 990.733 | 24.7 | 37.28 |
| 0.63 | 618.32 | 975.674 | 24.8 | 37.95 |
| 0.64 | 619.14 | 961.779 | 24.7 | 38.55 |
| 0.65 | 620.32 | 948.882 | 24.7 | 39.15 |
| 0.66 | 621.89 | 936.939 | 24.8 | 39.75 |
| 0.67 | 622.38 | 923.777 | 24.7 | 40.35 |
| 0.68 | 623.88 | 912.439 | 24.7 | 40.95 |
| 0.70 | 625.31 | 899.750 | 24.8 | 41.63 |
| 0.71 | 626.55 | 888.734 | 24.8 | 42.23 |
| 0.72 | 628.61 | 879.194 | 24.7 | 42.83 |
| 0.73 | 628.22 | 866.512 | 24.8 | 43.43 |
| 0.74 | 631.59 | 859.327 | 24.8 | 44.03 |
| 0.75 | 632.34 | 848.779 | 24.7 | 44.63 |
| 0.76 | 633.19 | 837.297 | 24.8 | 45.30 |
| 0.77 | 633.64 | 826.940 | 24.8 | 45.90 |
| 0.78 | 634.65 | 817.617 | 24.8 | 46.50 |
| 0.79 | 635.09 | 807.748 | 24.7 | 47.10 |
| 0.80 | 636.16 | 798.973 | 24.8 | 47.70 |
| 0.81 | 637.85 | 791.128 | 24.8 | 48.30 |
| 0.82 | 637.80 | 780.205 | 24.8 | 48.98 |
| 0.83 | 641.53 | 775.261 | 24.8 | 49.58 |
| 0.84 | 640.33 | 764.594 | 24.8 | 50.18 |
| 0.85 | 641.63 | 757.089 | 24.8 | 50.78 |
| 0.86 | 642.92 | 749.775 | 24.8 | 51.38 |
| 0.87 | 645.41 | 743.987 | 24.8 | 51.98 |
| 0.88 | 645.77 | 734.901 | 24.8 | 52.65 |
| 0.89 | 646.62 | 726.542 | 24.8 | 53.33 |
| 0.90 | 645.72 | 718.480 | 24.8 | 53.85 |
| 0.91 | 645.45 | 710.264 | 24.8 | 54.45 |
| 0.92 | 645.74 | 702.863 | 24.8 | 55.05 |
| 0.93 | 646.69 | 696.303 | 24.8 | 55.65 |
| 0.94 | 646.39 | 687.666 | 24.8 | 56.33 |
| 0.95 | 647.70 | 681.789 | 24.8 | 56.93 |
| 0.96 | 648.68 | 675.724 | 24.8 | 57.53 |
| 0.97 | 649.29 | 669.370 | 24.8 | 58.13 |
| 0.98 | 648.48 | 661.736 | 24.8 | 58.73 |
| 0.99 | 651.35 | 657.929 | 24.7 | 59.33 |
| 1.00 | 649.29 | 649.289 | 24.8 | 59.93 |

Example Table 7

Gelled Gasoline

| Lab ID | #1004-2-1 | #1004-2-2 |
|---|---|---|
| Gasoline | 90.00 | 97.00 |
| Kraton G 1702 | 10.00 | 3.00 |

Procedure: Cold mix the gasoline and polymer until lump free to achieve a slightly gelled liquid.

Example 8

| Component | wt. % |
|---|---|
| 6970 Oil | 69.132 |
| 4463 Oil | 29.628 |
| BHT | 0.02 |
| Kraton G 1702 | 1.22 |

Procedure: Heat the hydrocarbon oil and antioxidant to 50-60° C. Add the polymer with small increments and raise the temperature to 100-105° C. Mix until lump free to achieve a gel that has an excellent clarity. The shear thinning properties of this gel is given in detail below.

Figure 2:
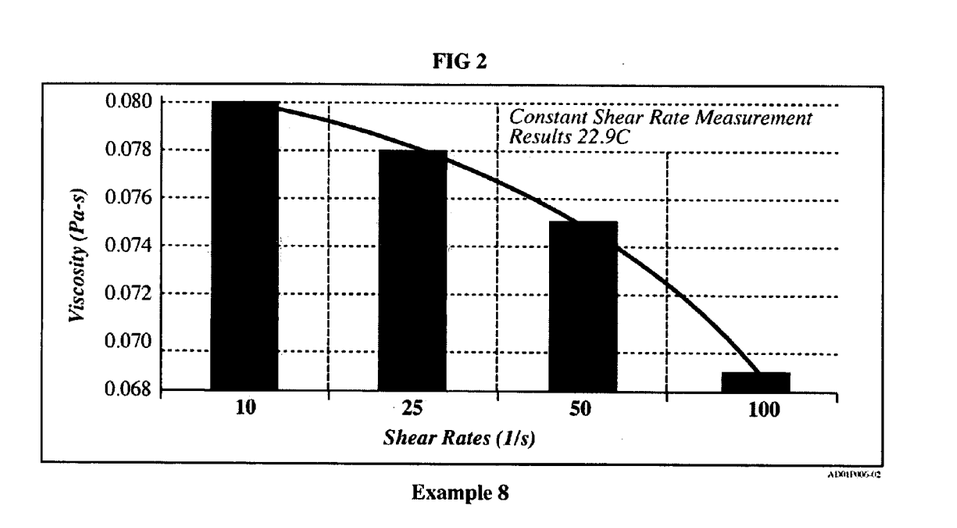
FIG. 2 is a bar graph with a trend line plotting shear rate against viscosity for an embodiment of the present invention made with a hydrocarbon mineral oil.

The table below and the graph in FIG. 2 show the relationship of viscosity to shear stress for the preferred embodiment of the present invention disclosed in Example 8 above. The dark line running about the bar graph is the trend line. These tests were conducted by an independent testing laboratory, Fluid Dynamics, Inc., Flemington Industrial Park, 45 River Road Bldg 500 Flemington, N.J. 08822.

Shear Test Summary for Example 8

| Shear Rate s−1 | Viscosity Pa-s |
|---|---|
| 10 | 0.080 |
| 25 | 0.078 |
| 50 | 0.075 |
| 100 | 0.069 |

Shear Test—Detailed Test Data for Example 8.

| Rate s−1 | Shear Stress Pa | Shear Stress Pa | Viscosity Pa-s | Viscosity Pa-s |
|---|---|---|---|---|
| 0.0 | 0.000 | 0.000 | | |
| 0.3 | 0.009 | 0.009 | 0.034 | 0.034 |
| 0.5 | 0.032 | 0.030 | 0.063 | 0.060 |
| 0.8 | 0.052 | 0.050 | 0.070 | 0.066 |
| 1.0 | 0.074 | 0.071 | 0.074 | 0.071 |
| 1.3 | 0.096 | 0.091 | 0.076 | 0.073 |
| 1.5 | 0.116 | 0.111 | 0.078 | 0.074 |
| 1.8 | 0.137 | 0.131 | 0.078 | 0.075 |
| 2.0 | 0.158 | 0.151 | 0.079 | 0.075 |
| 2.3 | 0.180 | 0.171 | 0.080 | 0.076 |
| 2.5 | 0.200 | 0.190 | 0.080 | 0.076 |
| 2.8 | 0.221 | 0.211 | 0.080 | 0.077 |
| 3.0 | 0.241 | 0.232 | 0.080 | 0.077 |
| 3.3 | 0.262 | 0.252 | 0.081 | 0.077 |
| 3.5 | 0.284 | 0.272 | 0.081 | 0.078 |
| 3.8 | 0.305 | 0.291 | 0.081 | 0.078 |
| 4.0 | 0.326 | 0.312 | 0.082 | 0.078 |
| 4.3 | 0.348 | 0.332 | 0.082 | 0.078 |
| 4.5 | 0.369 | 0.352 | 0.082 | 0.078 |
| 4.8 | 0.389 | 0.372 | 0.082 | 0.078 |
| 5.0 | 0.410 | 0.393 | 0.082 | 0.079 |
| 5.3 | 0.433 | 0.413 | 0.082 | 0.079 |
| 5.5 | 0.453 | 0.432 | 0.082 | 0.079 |
| 5.8 | 0.472 | 0.453 | 0.082 | 0.079 |
| 6.0 | 0.494 | 0.473 | 0.082 | 0.079 |
| 6.3 | 0.514 | 0.492 | 0.082 | 0.079 |
| 6.5 | 0.535 | 0.513 | 0.082 | 0.079 |
| 6.8 | 0.555 | 0.534 | 0.082 | 0.079 |
| 7.0 | 0.576 | 0.554 | 0.082 | 0.079 |
| 7.3 | 0.596 | 0.573 | 0.082 | 0.079 |
| 7.5 | 0.619 | 0.594 | 0.083 | 0.079 |
| 7.8 | 0.638 | 0.613 | 0.082 | 0.079 |
| 8.0 | 0.658 | 0.632 | 0.082 | 0.079 |
| 8.3 | 0.679 | 0.652 | 0.082 | 0.079 |
| 8.5 | 0.699 | 0.673 | 0.082 | 0.079 |
| 8.8 | 0.720 | 0.692 | 0.082 | 0.079 |
| 9.0 | 0.741 | 0.712 | 0.082 | 0.079 |
| 9.3 | 0.762 | 0.731 | 0.082 | 0.079 |
| 9.5 | 0.783 | 0.752 | 0.082 | 0.079 |
| 9.8 | 0.802 | 0.771 | 0.082 | 0.079 |
| 10.0 | 0.824 | 0.790 | 0.082 | 0.079 |
| 10.3 | 0.844 | 0.810 | 0.082 | 0.079 |
| 10.5 | 0.864 | 0.829 | 0.082 | 0.079 |
| 10.8 | 0.886 | 0.850 | 0.082 | 0.079 |
| 11.0 | 0.905 | 0.869 | 0.082 | 0.079 |
| 11.3 | 0.926 | 0.890 | 0.082 | 0.079 |
| 11.5 | 0.945 | 0.910 | 0.082 | 0.079 |
| 11.8 | 0.968 | 0.930 | 0.082 | 0.079 |
| 12.0 | 0.987 | 0.949 | 0.082 | 0.079 |
| 12.3 | 1.006 | 0.970 | 0.082 | 0.079 |
| 12.5 | 1.028 | 0.989 | 0.082 | 0.079 |
| 12.8 | 1.047 | 1.010 | 0.082 | 0.079 |
| 13.0 | 1.070 | 1.029 | 0.082 | 0.079 |
| 13.3 | 1.091 | 1.048 | 0.082 | 0.079 |
| 13.5 | 1.111 | 1.068 | 0.082 | 0.079 |
| 13.8 | 1.131 | 1.087 | 0.082 | 0.079 |
| 14.0 | 1.150 | 1.106 | 0.082 | 0.079 |
| 14.3 | 1.166 | 1.125 | 0.082 | 0.079 |
| 14.5 | 1.186 | 1.145 | 0.082 | 0.079 |
| 14.8 | 1.207 | 1.165 | 0.082 | 0.079 |
| 15.0 | 1.227 | 1.184 | 0.082 | 0.079 |
| 15.3 | 1.249 | 1.205 | 0.082 | 0.079 |
| 15.5 | 1.272 | 1.224 | 0.082 | 0.079 |
| 15.8 | 1.291 | 1.244 | 0.082 | 0.079 |
| 16.0 | 1.312 | 1.264 | 0.082 | 0.079 |
| 16.3 | 1.330 | 1.284 | 0.082 | 0.079 |
| 16.5 | 1.350 | 1.303 | 0.082 | 0.079 |
| 16.8 | 1.370 | 1.322 | 0.082 | 0.079 |
| 17.0 | 1.388 | 1.339 | 0.082 | 0.079 |
| 17.3 | 1.410 | 1.358 | 0.082 | 0.079 |
| 17.5 | 1.429 | 1.379 | 0.082 | 0.079 |
| 17.8 | 1.449 | 1.398 | 0.082 | 0.079 |
| 18.0 | 1.469 | 1.419 | 0.082 | 0.079 |
| 18.3 | 1.491 | 1.439 | 0.082 | 0.079 |
| 18.5 | 1.512 | 1.458 | 0.082 | 0.079 |
| 18.8 | 1.531 | 1.478 | 0.082 | 0.079 |
| 19.0 | 1.551 | 1.497 | 0.082 | 0.079 |
| 19.3 | 1.568 | 1.514 | 0.081 | 0.079 |
| 19.5 | 1.589 | 1.534 | 0.082 | 0.079 |
| 19.8 | 1.610 | 1.551 | 0.082 | 0.079 |
| 20.0 | 1.633 | 1.572 | 0.082 | 0.079 |
| 20.3 | 1.651 | 1.591 | 0.082 | 0.079 |
| 20.5 | 1.671 | 1.611 | 0.082 | 0.079 |
| 20.8 | 1.690 | 1.629 | 0.081 | 0.079 |
| 21.0 | 1.709 | 1.651 | 0.081 | 0.079 |
| 21.3 | 1.727 | 1.671 | 0.081 | 0.079 |
| 21.5 | 1.748 | 1.688 | 0.081 | 0.079 |
| 21.8 | 1.767 | 1.706 | 0.081 | 0.078 |
| 22.0 | 1.789 | 1.724 | 0.081 | 0.078 |
| 22.3 | 1.810 | 1.744 | 0.081 | 0.078 |
| 22.5 | 1.829 | 1.762 | 0.081 | 0.078 |
| 22.8 | 1.847 | 1.784 | 0.081 | 0.078 |
| 23.0 | 1.865 | 1.802 | 0.081 | 0.078 |
| 23.3 | 1.886 | 1.822 | 0.081 | 0.078 |
| 23.5 | 1.906 | 1.840 | 0.081 | 0.078 |
| 23.8 | 1.928 | 1.858 | 0.081 | 0.078 |
| 24.0 | 1.946 | 1.875 | 0.081 | 0.078 |
| 24.3 | 1.963 | 1.896 | 0.081 | 0.078 |
| 24.5 | 1.982 | 1.915 | 0.081 | 0.078 |
| 24.8 | 2.002 | 1.933 | 0.081 | 0.078 |
| 25.0 | 2.021 | 1.953 | 0.081 | 0.078 |
| 25.3 | 2.041 | 1.975 | 0.081 | 0.078 |

-continued

| Rate s−1 | Shear Stress Pa | Shear Stress Pa | Viscosity Pa-s | Viscosity Pa-s |
|---|---|---|---|---|
| 25.5 | 2.063 | 1.990 | 0.081 | 0.078 |
| 25.8 | 2.083 | 2.006 | 0.081 | 0.078 |
| 26.0 | 2.099 | 2.027 | 0.081 | 0.078 |
| 26.3 | 2.118 | 2.046 | 0.081 | 0.078 |
| 26.5 | 2.138 | 2.067 | 0.081 | 0.078 |
| 26.8 | 2.160 | 2.085 | 0.081 | 0.078 |
| 27.0 | 2.179 | 2.105 | 0.081 | 0.078 |
| 27.3 | 2.198 | 2.122 | 0.081 | 0.078 |
| 27.5 | 2.215 | 2.139 | 0.081 | 0.078 |
| 27.8 | 2.233 | 2.157 | 0.080 | 0.078 |
| 28.0 | 2.253 | 2.176 | 0.080 | 0.078 |
| 28.3 | 2.272 | 2.194 | 0.080 | 0.078 |
| 28.5 | 2.296 | 2.214 | 0.081 | 0.078 |
| 28.8 | 2.313 | 2.234 | 0.080 | 0.078 |
| 29.0 | 2.329 | 2.251 | 0.080 | 0.078 |
| 29.3 | 2.349 | 2.267 | 0.080 | 0.078 |
| 29.5 | 2.370 | 2.287 | 0.080 | 0.078 |
| 29.8 | 2.389 | 2.307 | 0.080 | 0.078 |
| 30.0 | 2.408 | 2.326 | 0.080 | 0.078 |
| 30.3 | 2.424 | 2.346 | 0.080 | 0.078 |
| 30.5 | 2.444 | 2.362 | 0.080 | 0.077 |
| 30.8 | 2.462 | 2.377 | 0.080 | 0.077 |
| 31.0 | 2.483 | 2.397 | 0.080 | 0.077 |
| 31.3 | 2.503 | 2.415 | 0.080 | 0.077 |
| 31.5 | 2.521 | 2.433 | 0.080 | 0.077 |
| 31.8 | 2.540 | 2.455 | 0.080 | 0.077 |
| 32.0 | 2.561 | 2.471 | 0.080 | 0.077 |
| 32.3 | 2.580 | 2.486 | 0.080 | 0.077 |
| 32.5 | 2.598 | 2.508 | 0.080 | 0.077 |
| 32.8 | 2.614 | 2.530 | 0.080 | 0.077 |
| 33.0 | 2.634 | 2.548 | 0.080 | 0.077 |
| 33.3 | 2.652 | 2.565 | 0.080 | 0.077 |
| 33.5 | 2.675 | 2.582 | 0.080 | 0.077 |
| 33.8 | 2.694 | 2.599 | 0.080 | 0.077 |
| 34.0 | 2.708 | 2.618 | 0.080 | 0.077 |
| 34.3 | 2.729 | 2.637 | 0.080 | 0.077 |
| 34.5 | 2.749 | 2.658 | 0.080 | 0.077 |
| 34.8 | 2.768 | 2.674 | 0.080 | 0.077 |
| 35.0 | 2.783 | 2.688 | 0.080 | 0.077 |
| 35.3 | 2.800 | 2.708 | 0.079 | 0.077 |
| 35.5 | 2.818 | 2.728 | 0.079 | 0.077 |
| 35.8 | 2.842 | 2.746 | 0.079 | 0.077 |
| 36.0 | 2.861 | 2.764 | 0.079 | 0.077 |
| 36.3 | 2.874 | 2.779 | 0.079 | 0.077 |
| 36.5 | 2.895 | 2.797 | 0.079 | 0.077 |
| 36.8 | 2.916 | 2.815 | 0.079 | 0.077 |
| 37.0 | 2.933 | 2.837 | 0.079 | 0.077 |
| 37.3 | 2.949 | 2.855 | 0.079 | 0.077 |
| 37.5 | 2.968 | 2.869 | 0.079 | 0.077 |
| 37.8 | 2.988 | 2.887 | 0.079 | 0.076 |
| 38.0 | 3.009 | 2.909 | 0.079 | 0.077 |
| 38.3 | 3.023 | 2.927 | 0.079 | 0.077 |
| 38.5 | 3.041 | 2.945 | 0.079 | 0.076 |
| 38.8 | 3.065 | 2.958 | 0.079 | 0.076 |
| 39.0 | 3.083 | 2.978 | 0.079 | 0.076 |
| 39.3 | 3.099 | 2.994 | 0.079 | 0.076 |
| 39.5 | 3.115 | 3.015 | 0.079 | 0.076 |
| 39.8 | 3.134 | 3.031 | 0.079 | 0.076 |
| 40.0 | 3.157 | 3.045 | 0.079 | 0.076 |
| 40.3 | 3.170 | 3.067 | 0.079 | 0.076 |
| 40.5 | 3.188 | 3.087 | 0.079 | 0.076 |
| 40.8 | 3.210 | 3.103 | 0.079 | 0.076 |
| 41.0 | 3.227 | 3.118 | 0.079 | 0.076 |
| 41.3 | 3.242 | 3.135 | 0.079 | 0.076 |
| 41.5 | 3.260 | 3.150 | 0.079 | 0.076 |
| 41.8 | 3.280 | 3.174 | 0.079 | 0.076 |
| 42.0 | 3.301 | 3.191 | 0.079 | 0.076 |
| 42.3 | 3.314 | 3.204 | 0.078 | 0.076 |
| 42.5 | 3.334 | 3.225 | 0.078 | 0.076 |
| 42.8 | 3.354 | 3.245 | 0.078 | 0.076 |
| 43.0 | 3.370 | 3.261 | 0.078 | 0.076 |
| 43.3 | 3.387 | 3.275 | 0.078 | 0.076 |
| 43.5 | 3.405 | 3.292 | 0.078 | 0.076 |
| 43.8 | 3.428 | 3.310 | 0.078 | 0.076 |
| 44.0 | 3.441 | 3.333 | 0.078 | 0.076 |
| 44.3 | 3.460 | 3.345 | 0.078 | 0.076 |
| 44.5 | 3.481 | 3.363 | 0.078 | 0.076 |
| 44.8 | 3.498 | 3.384 | 0.078 | 0.076 |
| 45.0 | 3.512 | 3.401 | 0.078 | 0.076 |
| 45.3 | 3.530 | 3.416 | 0.078 | 0.076 |
| 45.5 | 3.552 | 3.431 | 0.078 | 0.075 |
| 45.8 | 3.566 | 3.450 | 0.078 | 0.075 |
| 46.0 | 3.583 | 3.471 | 0.078 | 0.075 |
| 46.3 | 3.607 | 3.486 | 0.078 | 0.075 |
| 46.5 | 3.622 | 3.502 | 0.078 | 0.075 |
| 46.8 | 3.637 | 3.522 | 0.078 | 0.075 |
| 47.0 | 3.654 | 3.541 | 0.078 | 0.075 |
| 47.3 | 3.676 | 3.555 | 0.078 | 0.075 |
| 47.5 | 3.690 | 3.568 | 0.078 | 0.075 |
| 47.8 | 3.709 | 3.586 | 0.078 | 0.075 |
| 48.0 | 3.731 | 3.610 | 0.078 | 0.075 |
| 48.3 | 3.745 | 3.623 | 0.078 | 0.075 |
| 48.5 | 3.762 | 3.636 | 0.078 | 0.075 |
| 48.8 | 3.781 | 3.659 | 0.078 | 0.075 |
| 49.0 | 3.799 | 3.676 | 0.078 | 0.075 |
| 49.3 | 3.813 | 3.690 | 0.077 | 0.075 |
| 49.5 | 3.836 | 3.705 | 0.078 | 0.075 |
| 49.8 | 3.851 | 3.724 | 0.077 | 0.075 |
| 50.0 | 3.866 | 3.744 | 0.077 | 0.075 |
| 50.3 | 3.884 | 3.757 | 0.077 | 0.075 |
| 50.5 | 3.905 | 3.777 | 0.077 | 0.075 |
| 50.8 | 3.917 | 3.796 | 0.077 | 0.075 |
| 51.0 | 3.940 | 3.810 | 0.077 | 0.075 |
| 51.3 | 3.956 | 3.825 | 0.077 | 0.075 |
| 51.5 | 3.970 | 3.841 | 0.077 | 0.075 |
| 51.8 | 3.987 | 3.863 | 0.077 | 0.075 |
| 52.0 | 4.010 | 3.875 | 0.077 | 0.075 |
| 52.3 | 4.023 | 3.893 | 0.077 | 0.075 |
| 52.5 | 4.044 | 3.915 | 0.077 | 0.075 |
| 52.8 | 4.062 | 3.930 | 0.077 | 0.075 |
| 53.0 | 4.074 | 3.941 | 0.077 | 0.074 |
| 53.3 | 4.091 | 3.960 | 0.077 | 0.074 |
| 53.5 | 4.113 | 3.982 | 0.077 | 0.074 |
| 53.8 | 4.125 | 3.993 | 0.077 | 0.074 |
| 54.0 | 4.148 | 4.011 | 0.077 | 0.074 |
| 54.3 | 4.166 | 4.033 | 0.077 | 0.074 |
| 54.5 | 4.179 | 4.047 | 0.077 | 0.074 |
| 54.8 | 4.195 | 4.060 | 0.077 | 0.074 |
| 55.0 | 4.217 | 4.077 | 0.077 | 0.074 |
| 55.3 | 4.229 | 4.100 | 0.077 | 0.074 |
| 55.5 | 4.252 | 4.110 | 0.077 | 0.074 |
| 55.8 | 4.267 | 4.128 | 0.077 | 0.074 |
| 56.0 | 4.281 | 4.149 | 0.076 | 0.074 |
| 56.3 | 4.301 | 4.161 | 0.076 | 0.074 |
| 56.5 | 4.317 | 4.175 | 0.076 | 0.074 |
| 56.8 | 4.335 | 4.196 | 0.076 | 0.074 |
| 57.0 | 4.354 | 4.213 | 0.076 | 0.074 |
| 57.3 | 4.366 | 4.224 | 0.076 | 0.074 |
| 57.5 | 4.384 | 4.247 | 0.076 | 0.074 |
| 57.8 | 4.406 | 4.264 | 0.076 | 0.074 |
| 58.0 | 4.417 | 4.276 | 0.076 | 0.074 |
| 58.3 | 4.439 | 4.293 | 0.076 | 0.074 |
| 58.5 | 4.454 | 4.314 | 0.076 | 0.074 |
| 58.8 | 4.468 | 4.325 | 0.076 | 0.074 |
| 59.0 | 4.491 | 4.346 | 0.076 | 0.074 |
| 59.3 | 4.504 | 4.364 | 0.076 | 0.074 |
| 59.5 | 4.523 | 4.376 | 0.076 | 0.074 |
| 59.8 | 4.541 | 4.391 | 0.076 | 0.073 |
| 60.0 | 4.553 | 4.412 | 0.076 | 0.074 |
| 60.3 | 4.571 | 4.424 | 0.076 | 0.073 |
| 60.5 | 4.590 | 4.442 | 0.076 | 0.073 |
| 60.8 | 4.607 | 4.463 | 0.076 | 0.073 |
| 61.0 | 4.627 | 4.475 | 0.076 | 0.073 |
| 61.3 | 4.638 | 4.489 | 0.076 | 0.073 |
| 61.5 | 4.654 | 4.510 | 0.076 | 0.073 |
| 61.8 | 4.676 | 4.524 | 0.076 | 0.073 |
| 62.0 | 4.688 | 4.540 | 0.076 | 0.073 |
| 62.3 | 4.711 | 4.560 | 0.076 | 0.073 |
| 62.5 | 4.723 | 4.574 | 0.076 | 0.073 |
| 62.8 | 4.738 | 4.588 | 0.076 | 0.073 |
| 63.0 | 4.760 | 4.608 | 0.076 | 0.073 |
| 63.3 | 4.772 | 4.622 | 0.075 | 0.073 |

-continued

| Rate s−1 | Shear Stress Pa | Shear Stress Pa | Viscosity Pa-s | Viscosity Pa-s |
|---|---|---|---|---|
| 63.5 | 4.794 | 4.638 | 0.075 | 0.073 |
| 63.8 | 4.806 | 4.658 | 0.075 | 0.073 |
| 64.0 | 4.823 | 4.667 | 0.075 | 0.073 |
| 64.3 | 4.842 | 4.684 | 0.075 | 0.073 |
| 64.5 | 4.854 | 4.708 | 0.075 | 0.073 |
| 64.8 | 4.875 | 4.717 | 0.075 | 0.073 |
| 65.0 | 4.886 | 4.737 | 0.075 | 0.073 |
| 65.3 | 4.905 | 4.754 | 0.075 | 0.073 |
| 65.5 | 4.923 | 4.765 | 0.075 | 0.073 |
| 65.8 | 4.941 | 4.781 | 0.075 | 0.073 |
| 66.0 | 4.958 | 4.803 | 0.075 | 0.073 |
| 66.3 | 4.969 | 4.814 | 0.075 | 0.073 |
| 66.5 | 4.990 | 4.835 | 0.075 | 0.073 |
| 66.8 | 5.004 | 4.850 | 0.075 | 0.073 |
| 67.0 | 5.024 | 4.860 | 0.075 | 0.073 |
| 67.3 | 5.037 | 4.881 | 0.075 | 0.073 |
| 67.5 | 5.048 | 4.895 | 0.075 | 0.073 |
| 67.8 | 5.072 | 4.913 | 0.075 | 0.073 |
| 68.0 | 5.084 | 4.934 | 0.075 | 0.073 |
| 68.3 | 5.106 | 4.943 | 0.075 | 0.072 |
| 68.5 | 5.115 | 4.959 | 0.075 | 0.072 |
| 68.8 | 5.131 | 4.980 | 0.075 | 0.072 |
| 69.0 | 5.152 | 4.990 | 0.075 | 0.072 |
| 69.3 | 5.170 | 5.012 | 0.075 | 0.072 |
| 69.5 | 5.187 | 5.025 | 0.075 | 0.072 |
| 69.8 | 5.197 | 5.036 | 0.075 | 0.072 |
| 70.0 | 5.219 | 5.057 | 0.075 | 0.072 |
| 70.3 | 5.231 | 5.068 | 0.074 | 0.072 |
| 70.5 | 5.252 | 5.088 | 0.075 | 0.072 |
| 70.8 | 5.264 | 5.103 | 0.074 | 0.072 |
| 71.0 | 5.281 | 5.113 | 0.074 | 0.072 |
| 71.3 | 5.300 | 5.134 | 0.074 | 0.072 |
| 71.5 | 5.316 | 5.148 | 0.074 | 0.072 |
| 71.8 | 5.332 | 5.165 | 0.074 | 0.072 |
| 72.0 | 5.344 | 5.184 | 0.074 | 0.072 |
| 72.3 | 5.366 | 5.193 | 0.074 | 0.072 |
| 72.5 | 5.377 | 5.210 | 0.074 | 0.072 |
| 72.8 | 5.401 | 5.229 | 0.074 | 0.072 |
| 73.0 | 5.409 | 5.241 | 0.074 | 0.072 |
| 73.3 | 5.431 | 5.263 | 0.074 | 0.072 |
| 73.5 | 5.448 | 5.274 | 0.074 | 0.072 |
| 73.8 | 5.470 | 5.289 | 0.074 | 0.072 |
| 74.0 | 5.479 | 5.308 | 0.074 | 0.072 |
| 74.3 | 5.497 | 5.320 | 0.074 | 0.072 |
| 74.5 | 5.515 | 5.343 | 0.074 | 0.072 |
| 74.8 | 5.534 | 5.351 | 0.074 | 0.072 |
| 75.0 | 5.547 | 5.366 | 0.074 | 0.072 |
| 75.3 | 5.560 | 5.387 | 0.074 | 0.072 |
| 75.5 | 5.580 | 5.401 | 0.074 | 0.072 |
| 75.8 | 5.596 | 5.421 | 0.074 | 0.072 |
| 76.0 | 5.611 | 5.429 | 0.074 | 0.071 |
| 76.3 | 5.623 | 5.446 | 0.074 | 0.071 |
| 76.5 | 5.647 | 5.466 | 0.074 | 0.071 |
| 76.8 | 5.660 | 5.479 | 0.074 | 0.071 |
| 77.0 | 5.677 | 5.497 | 0.074 | 0.071 |
| 77.3 | 5.688 | 5.506 | 0.074 | 0.071 |
| 77.5 | 5.711 | 5.528 | 0.074 | 0.071 |
| 77.8 | 5.722 | 5.540 | 0.074 | 0.071 |
| 78.0 | 5.742 | 5.558 | 0.074 | 0.071 |
| 78.3 | 5.750 | 5.573 | 0.073 | 0.071 |
| 78.5 | 5.773 | 5.585 | 0.074 | 0.071 |
| 78.8 | 5.786 | 5.604 | 0.073 | 0.071 |
| 79.0 | 5.806 | 5.614 | 0.073 | 0.071 |
| 79.3 | 5.816 | 5.637 | 0.073 | 0.071 |
| 79.5 | 5.837 | 5.651 | 0.073 | 0.071 |
| 79.8 | 5.850 | 5.663 | 0.073 | 0.071 |
| 80.0 | 5.869 | 5.683 | 0.073 | 0.071 |
| 80.3 | 5.877 | 5.694 | 0.073 | 0.071 |
| 80.5 | 5.903 | 5.717 | 0.073 | 0.071 |
| 80.8 | 5.916 | 5.724 | 0.073 | 0.071 |
| 81.0 | 5.932 | 5.741 | 0.073 | 0.071 |
| 81.3 | 5.944 | 5.756 | 0.073 | 0.071 |
| 81.5 | 5.966 | 5.775 | 0.073 | 0.071 |
| 81.8 | 5.980 | 5.790 | 0.073 | 0.071 |
| 82.0 | 5.993 | 5.799 | 0.073 | 0.071 |
| 82.3 | 6.007 | 5.823 | 0.073 | 0.071 |
| 82.5 | 6.027 | 5.832 | 0.073 | 0.071 |
| 82.8 | 6.043 | 5.853 | 0.073 | 0.071 |
| 83.0 | 6.055 | 5.861 | 0.073 | 0.071 |
| 83.3 | 6.072 | 5.882 | 0.073 | 0.071 |
| 83.5 | 6.085 | 5.897 | 0.073 | 0.071 |
| 83.8 | 6.102 | 5.912 | 0.073 | 0.071 |
| 84.0 | 6.111 | 5.928 | 0.073 | 0.071 |
| 84.3 | 6.131 | 5.938 | 0.073 | 0.070 |
| 84.5 | 6.145 | 5.960 | 0.073 | 0.071 |
| 84.8 | 6.166 | 5.968 | 0.073 | 0.070 |
| 85.0 | 6.173 | 5.992 | 0.073 | 0.070 |
| 85.3 | 6.195 | 5.999 | 0.073 | 0.070 |
| 85.5 | 6.213 | 6.018 | 0.073 | 0.070 |
| 85.8 | 6.226 | 6.028 | 0.073 | 0.070 |
| 86.0 | 6.240 | 6.053 | 0.073 | 0.070 |
| 86.3 | 6.258 | 6.061 | 0.073 | 0.070 |
| 86.5 | 6.277 | 6.076 | 0.073 | 0.070 |
| 86.8 | 6.286 | 6.092 | 0.072 | 0.070 |
| 87.0 | 6.306 | 6.110 | 0.072 | 0.070 |
| 87.3 | 6.319 | 6.123 | 0.072 | 0.070 |
| 87.5 | 6.339 | 6.133 | 0.072 | 0.070 |
| 87.8 | 6.347 | 6.158 | 0.072 | 0.070 |
| 88.0 | 6.369 | 6.169 | 0.072 | 0.070 |
| 88.3 | 6.387 | 6.188 | 0.072 | 0.070 |
| 88.5 | 6.399 | 6.195 | 0.072 | 0.070 |
| 88.8 | 6.415 | 6.218 | 0.072 | 0.070 |
| 89.0 | 6.429 | 6.226 | 0.072 | 0.070 |
| 89.3 | 6.450 | 6.248 | 0.072 | 0.070 |
| 89.5 | 6.457 | 6.256 | 0.072 | 0.070 |
| 89.8 | 6.479 | 6.276 | 0.072 | 0.070 |
| 90.0 | 6.493 | 6.285 | 0.072 | 0.070 |
| 90.3 | 6.506 | 6.309 | 0.072 | 0.070 |
| 90.5 | 6.524 | 6.316 | 0.072 | 0.070 |
| 90.8 | 6.537 | 6.333 | 0.072 | 0.070 |
| 91.0 | 6.556 | 6.345 | 0.072 | 0.070 |
| 91.3 | 6.564 | 6.369 | 0.072 | 0.070 |
| 91.5 | 6.586 | 6.376 | 0.072 | 0.070 |
| 91.8 | 6.600 | 6.395 | 0.072 | 0.070 |
| 92.0 | 6.612 | 6.408 | 0.072 | 0.070 |
| 92.3 | 6.632 | 6.428 | 0.072 | 0.070 |
| 92.5 | 6.646 | 6.436 | 0.072 | 0.070 |
| 92.8 | 6.666 | 6.454 | 0.072 | 0.070 |
| 93.0 | 6.675 | 6.468 | 0.072 | 0.070 |
| 93.3 | 6.694 | 6.487 | 0.072 | 0.070 |
| 93.5 | 6.713 | 6.496 | 0.072 | 0.069 |
| 93.8 | 6.720 | 6.514 | 0.072 | 0.069 |
| 94.0 | 6.741 | 6.526 | 0.072 | 0.069 |
| 94.3 | 6.754 | 6.546 | 0.072 | 0.069 |
| 94.5 | 6.768 | 6.555 | 0.072 | 0.069 |
| 94.8 | 6.785 | 6.573 | 0.072 | 0.069 |
| 95.0 | 6.797 | 6.582 | 0.072 | 0.069 |
| 95.3 | 6.817 | 6.606 | 0.072 | 0.069 |
| 95.5 | 6.826 | 6.612 | 0.071 | 0.069 |
| 95.8 | 6.844 | 6.634 | 0.071 | 0.069 |
| 96.0 | 6.863 | 6.644 | 0.071 | 0.069 |
| 96.3 | 6.872 | 6.668 | 0.071 | 0.069 |
| 96.5 | 6.894 | 6.673 | 0.071 | 0.069 |
| 96.8 | 6.909 | 6.694 | 0.071 | 0.069 |
| 97.0 | 6.919 | 6.703 | 0.071 | 0.069 |
| 97.3 | 6.937 | 6.726 | 0.071 | 0.069 |
| 97.5 | 6.951 | 6.730 | 0.071 | 0.069 |
| 97.8 | 6.966 | 6.754 | 0.071 | 0.069 |
| 98.0 | 6.982 | 6.766 | 0.071 | 0.069 |
| 98.3 | 6.997 | 6.780 | 0.071 | 0.069 |
| 98.5 | 7.016 | 6.792 | 0.071 | 0.069 |
| 98.8 | 7.025 | 6.810 | 0.071 | 0.069 |
| 99.0 | 7.042 | 6.826 | 0.071 | 0.069 |
| 99.3 | 7.061 | 6.836 | 0.071 | 0.069 |
| 99.5 | 7.069 | 6.852 | 0.071 | 0.069 |
| 99.8 | 7.088 | 6.865 | 0.071 | 0.069 |
| 100.0 | 7.106 | 6.889 | 0.071 | 0.069 |
| 99.8 | 7.099 | 6.882 | 0.071 | 0.069 |
| 99.5 | 7.090 | 6.870 | 0.071 | 0.069 |
| 99.3 | 7.076 | 6.850 | 0.071 | 0.069 |
| 99.0 | 7.054 | 6.843 | 0.071 | 0.069 |
| 98.8 | 7.044 | 6.819 | 0.071 | 0.069 |

-continued

| Rate s-1 | Shear Stress Pa | Shear Stress Pa | Viscosity Pa-s | Viscosity Pa-s |
|---|---|---|---|---|
| 98.5 | 7.030 | 6.811 | 0.071 | 0.069 |
| 98.3 | 7.013 | 6.794 | 0.071 | 0.069 |
| 98.0 | 6.998 | 6.780 | 0.071 | 0.069 |
| 97.8 | 6.983 | 6.763 | 0.071 | 0.069 |
| 97.5 | 6.967 | 6.753 | 0.071 | 0.069 |
| 97.3 | 6.953 | 6.738 | 0.071 | 0.069 |
| 97.0 | 6.934 | 6.718 | 0.071 | 0.069 |
| 96.8 | 6.924 | 6.704 | 0.072 | 0.069 |
| 96.5 | 6.904 | 6.690 | 0.072 | 0.069 |
| 96.3 | 6.892 | 6.679 | 0.072 | 0.069 |
| 96.0 | 6.878 | 6.658 | 0.072 | 0.069 |
| 95.8 | 6.855 | 6.648 | 0.072 | 0.069 |
| 95.5 | 6.844 | 6.627 | 0.072 | 0.069 |
| 95.3 | 6.830 | 6.619 | 0.072 | 0.069 |
| 95.0 | 6.811 | 6.596 | 0.072 | 0.069 |
| 94.8 | 6.797 | 6.585 | 0.072 | 0.070 |

As shown in the examples given above, embodiments of the present invention provide a hydrocarbon gel composition that has lower viscosity when it in shear moving through an orifice than in bulk prior to movement through the orifice or in bulk after passing through the orifice. Numerous products such as furniture polish, insecticides, and other industrial and household product that include petroleum distillates may be made from the gel compositions taught by the present invention.

While the invention has been described with respect to a limited number of embodiments and specific examples, the features of one embodiment or example should not be attributed to other embodiments of the invention. No single embodiment is representative of all aspects of the inventions. In some embodiments, the gel compositions may include numerous compounds not specifically mentioned herein. In other embodiments, the gel compositions do not include, or are substantially free of, any compounds not enumerated herein. Moreover, variations and modifications exist. More than one hydrocarbon or gelling agent or polymer may be used in the gel composition. Various additives may be used to further enhance one or more properties of the gel compositions and any consumer or industrial product made therefrom. Such additive may be a polish, solvents, or wax. Cross-linking within the gel may be either enhanced or reduced, as desired, by physical or chemical methods in order to modify the properties of the composition. It should also be understood that uses of the gel compositions are not limited to household product. While the processes are described as comprising one or more steps, it should be understood that these steps may be practiced in any order or sequence unless otherwise indicated. These steps may be combined or separated. Finally, any number disclosed herein should be construed to mean approximate, regardless of whether the word "about" or "approximate" is used in describing the number. The appended claims intend to cover all such variations and modifications as falling within the scope of the invention.

The invention claimed is:

1. A method for increasing the at rest viscosity of a petroleum distillate product having a hydrocarbon base, said method comprising:
   combining an antioxidant to the hydrocarbon base to produce a mixture;
   heating the mixture to a temperature ranging from about 50° C. to about 60° C.;
   combining a sufficient amount of a shear-thinning pseudoplastic thickener to the mixture to make the product pseudoplastic, wherein the pseudoplastic thickener consists of a diblock copolymer
   increasing the temperature of the mixture to a temperature ranging from about 100° C. to about 105° C.;
   maintaining the temperature until the mixture forms a gel;
   optionally, increasing the temperature to about 140° C.;
   optionally, adding an amino acid gelling agent; and
   mixing the gel until the gel is free of one or more lumps and has a viscosity ranging from about 50 SUS at 100° F. to about 400 SUS at 100° F.

2. The method of claim 1, said method further comprising the step of:
   producing the pseudoplastic petroleum distillate product having a final composition of 100 total weight percent wherein the diblock copolymer is from about 0.5 weight percent to about 30 weight percent and the hydrocarbon base is from about 70 weight percent to about 99 weight percent.

3. The method of claim 2, wherein the diblock copolymer comprises about 0.5 percent to about 15 percent by weight of the petroleum distillate product.

4. The method of claim 3, wherein the petroleum distillate product initially has a viscosity of less than about 150 SUS at 100° F.

5. The method of claim 3, wherein the pseudoplastic product is from about 0.5 weight percent to about 12 weight percent of the diblock copolymer.

6. The method of claim 5, wherein the pseudoplastic product is from about 0.5 weight percent to about 2 weight percent of the diblock copolymer.

7. The method of claim 2, wherein the hydrocarbon base is selected from the group consisting of mineral oils, mineral spirits, naphthalene, long carbon chain esters, vegetable oils, and mixtures thereof.

8. The method of claim 7, wherein the hydrocarbon base is selected from the group consisting of mineral oils, long carbon chain esters, and mixtures thereof.

9. The method of claim 8, wherein the long chain esters are $C_6$ to about $C_{40}$.

10. The method of claim 1, wherein the antioxidant is BHT.

11. A method for increasing the at rest viscosity of a petroleum distillate product having a hydrocarbon base, said method comprising:
   adding to said hydrocarbon base an effective amount of a shear-thinning pseudoplastic thickener to make the product pseudoplastic, wherein the pseudoplastic thickener consists of a diblock copolymer;
   heating the pseudoplastic product to a temperature ranging from about 50° C. to about 60° C.;
   increasing the temperature of the pseudoplastic product to a temperature ranging from about 100° C. to about 105° C.;
   maintaining the temperature until the pseudoplastic product forms a gel;
   optionally, increasing the temperature to about 140° C.;
   optionally, adding an amino acid gelling agent; and
   mixing the gel until the gel is free of one or more lumps and has a viscosity ranging from about 50 SUS at 100° F. to about 400 SUS at 100° F.

12. The method of claim 11, wherein the petroleum distillate product initially has a viscosity of less than about 150 SUS at 100° F.

13. The method of claim 11, wherein the hydrocarbon base is selected from the group consisting of mineral oils, mineral spirits, naphthalene, long carbon chain esters, vegetable oils, and mixtures thereof.

14. The method of claim 11, wherein the hydrocarbon base is gasoline.

15. The method of claim 11, said method further comprising the step of:
   producing the pseudoplastic petroleum distillate product having a final composition of 100 total weight percent wherein the diblock copolymer from about 0.5 weight percent to about 30 weight percent and the hydrocarbon base is from about 70 weight percent to about 99 weight percent.

16. The method of claim 15, wherein the pseudoplastic product is from about 0.5 weight percent to about 15 weight percent of the diblock copolymer.

17. The method of claim 15, wherein the pseudoplastic product is from about 0.5 weight percent to about 12 weight percent of the diblock copolymer.

18. The method of claim 15, wherein the pseudoplastic product is from about 0.5 weight percent to about 2 weight percent of the diblock copolymer.

* * * * *

UNITED STATES PATENT AND TRADEMARK OFFICE
CERTIFICATE OF CORRECTION

PATENT NO.       : 8,623,953 B2                                           Page 1 of 1
APPLICATION NO.  : 12/386319
DATED            : January 7, 2014
INVENTOR(S)      : Steluta Gina Butuc It is certified that error appears in the above-identified patent and that said Letters Patent is hereby corrected as shown below:

Title Page, item "(63)" corresponding to the "Related U.S. Application Data" section of the Bibliographic page is absent. Between items "(65)" and "(51)" on the Bibliographic page of the patent should read:

--(63)   Continuation of application No. 11/980,997, filed on Oct. 31, 2007, now abandoned, a divisional of application No. 10/716,284, filed Nov. 18, 2003, now abandoned.--

Signed and Sealed this
Eighth Day of April, 2014

Michelle K. Lee
*Deputy Director of the United States Patent and Trademark Office*